Jan. 30, 1934.　　　W. K. KINGSLAND　　　1,945,278
BRAKE TESTER
Filed Feb. 27, 1933　　　2 Sheets-Sheet 1

INVENTOR
William K. Kingsland
By W. W. Williamson
Atty.

Jan. 30, 1934.  W. K. KINGSLAND  1,945,278
BRAKE TESTER
Filed Feb. 27, 1933   2 Sheets-Sheet 2
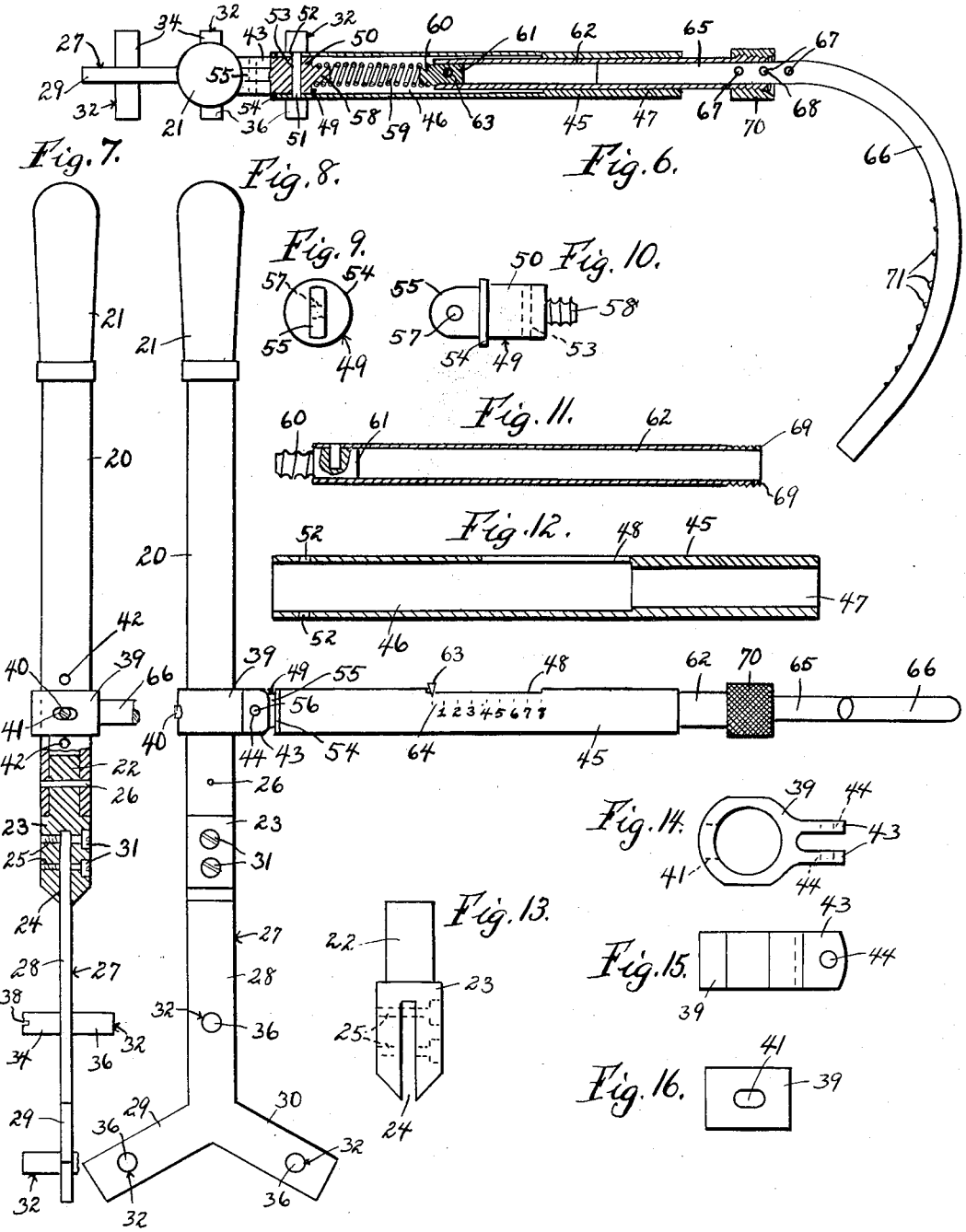
INVENTOR
William K. Kingsland
By W. W. Williamson
Atty.

Patented Jan. 30, 1934

1,945,278

UNITED STATES PATENT OFFICE 1,945,278

BRAKE TESTER

William K. Kingsland, Philadelphia, Pa.

Application February 27, 1933. Serial No. 658,679

6 Claims. (Cl. 265—1)

My invention relates to new and useful improvements in a brake tester, particularly for use in connection with motor vehicles, and has for one of its objects to provide an exceedingly simple and effective device of this description which may be readily adjusted for use upon left hand or right hand wheels.

Another object of the invention is to provide for testing the grip or hold of each brake independently and to determine the amount of pull necessary to turn the wheel under the brake grip so that each brake may be adjusted to give the same hold upon each of the wheels.

Another object of the invention is to so construct the brake tester that it may be ratcheted about the wheel to determine the point of greatest gripping power of the brake on each wheel. This is particularly advantageous since most brake drums are not perfectly round and brakes generally have a greater gripping power at one point on the circumference of the brake drum, and if one wheel is tested at the point of greatest braking power and another brake then adjusted at the point of lowest braking power and two of such brakes adjusted until they have what seems to be the same braking power, when in actual use the one which was adjusted at the lowest point will have greater braking power than the one which was adjusted at the high point.

Another object of the invention is to provide a limited swinging motion between the handle and hook elements of the device in order to accommodate varying distances between the side of a tire and the outer end of a wheel hub.

Another object of the invention is to provide a structure which may fulcrum on the inside or outside of a wheel hub.

A further object of the invention is to provide interchangeable fulcrum members.

A still further object of the invention is to provide a fulcrum member having adjustable bearing elements so that it can be regulated to fit different sized hubs.

Other objects of the invention will be apparent from the illustration and description of the structure and operation of the device.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 6 is a view looking down on top of the handle with some of the parts shown in section to illustrate details of construction.

Fig. 7 is a view looking toward what I term the front of the handle or at the ends of the device opposite the tire engaging hook partly broken away to show details of construction.

Fig. 8 is a side elevation thereof.

Fig. 9 is an end view of one of the spring connecting members.

Fig. 10 is a side elevation thereof.

Fig. 11 is a longitudinal sectional view of the sliding barrel with the other spring connector therein.

Fig. 12 is a longitudinal sectional view of the sleeve in which the sliding barrel is mounted.

Fig. 13 is a side elevation of the plug which acts as a hanger for the fulcrum member.

Fig. 14 is a plan view of the collar which connects the indicating portion of the tester with the handle.

Fig. 15 is a side elevation thereof.

Fig. 16 is a rear end view of the same.

Figure 1:
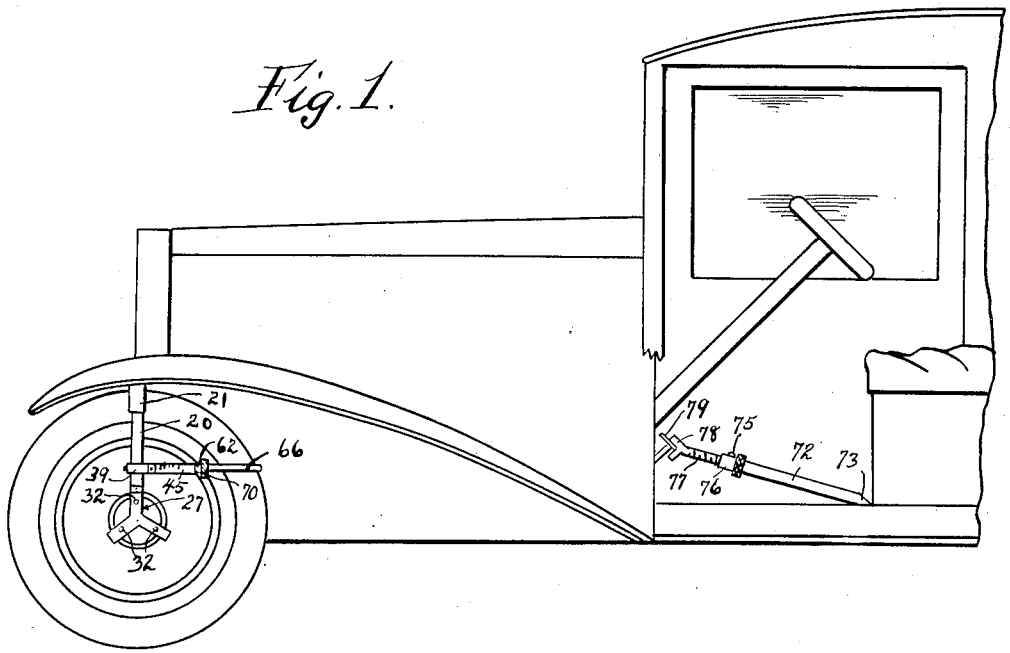
Fig. 1 is a side elevation of a portion of an automobile showing my device in position for testing one of the brakes of the automobile.

In carrying out my invention as herein embodied, 20 represents a tubular handle or operating bar which may be provided at its upper end with a hand hold 21 and in the lower end is fitted the shank 22 of a plug 23 having a longitudinal open ended slot 24 formed therein with screw receiving openings 25 crosswise thereof. Said plug is held in place in any suitable manner, and for purposes of illustration I have shown a pin 26 passing through the tubular handle and the shank of said plug.

In the slotted portion of the plug is removably mounted a fulcrum member 27 comprising three arms 28, 29 and 30, and one of these arms, as 28, may be longer than the others for insertion in the slot 24 in the plug 23, where it will be temporarily held by the screws 31 threaded into the holes 25 and passing through the arm 28. On all of the arms are mounted bearing members 32 extending from both faces of said arms, and the preferred construction of said bearing members will be presently described. As shown in Fig. 8, said bearing members are permanently fixed at equi-distant points from the common axis of said arms.

Figure 2:
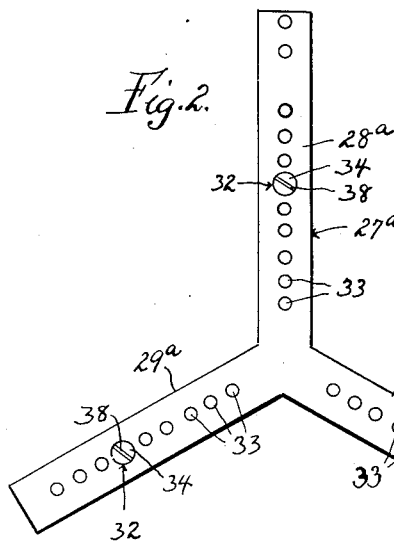
Fig. 2 is a face view of the adjustable fulcrum member separate from the rest of the structure.
Figure 3:
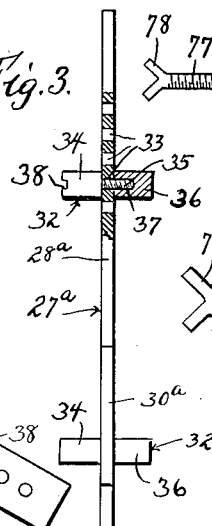
Fig. 3 is an edge view thereof with a portion broken away and shown in section to illustrate the manner of mounting the bearing elements.
Figure 4:
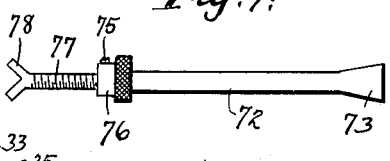
Fig. 4 is a plan view of a brake pedal holder which may be used for holding the brakes under tension while the testing operations are being carried out.
Figure 5:
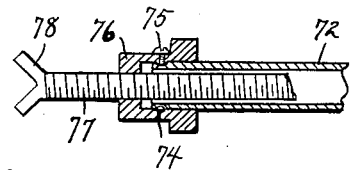
Fig. 5 is an enlarged fragmentary sectional view of one end of the brake pedal holder showing the details of construction by which the adjustment of the length of said device is accomplished.

A similar construction of fulcrum element 27a is shown in Figs. 2 and 3 as comprising three arms 28a, 29a and 30a radiating from a common center and equally spaced apart, and in each of these arms is formed a plurality or series of holes 33 whereby the bearing members 32 may be mounted on the fulcrum element.

Each bearing member 32 preferably includes a short section of rod 34 having a threaded stem 35 which is projected through one of the holes 33 with another section of rod 36 provided with a threaded socket 37 screwed on to the projecting end of the threaded stem 35, whereby the two parts of a bearing member will be clamped on to an arm of the fulcrum element and one of these parts of the bearing member may have a screw driver slot 38 for the reception of the blade of a screw driver in assembling or disassembling a bearing member.

On the handle 20 adjacent its lower end is mounted a collar 39 capable of sliding and rotating on the handle, and in order to hold said collar in different adjusted positions longitudinally along the handle, a screw 40 is projected through a slot 41 and threaded into any one of a number of holes 42 positioned in a series spaced apart longitudinally of the handle, and the slot 41 is of a length sufficient to permit a limited rotary movement of the collar on the handle whereby said handle may have a lateral movement without affecting the other parts of the apparatus. The collar 39 has a pair of spaced lugs 43 with holes 44 therethrough for a purpose to be presently described.

The reference 45 represents a tube or barrel having a bore of two different diameters, the larger one being designated by the numeral 46, while the smaller one is indicated by the numeral 47, and at the inner end of that part of the tube or barrel having the portion of the bore of larger diameter is formed a longitudinal slot 48. In the outer end of the bore of larger diameter is mounted a spring connector 49 having a body portion 50 which snugly fits into the end of the tube or barrel 45 where it is fastened by a pin 51 projecting through holes 52 in opposite portions of the tube or barrel and through a hole 53 in the body of the connector. On the outer end of the connector is a flange 54 which seats against the end of the tube or barrel 45 and from said outer end of the body projects a lug 55 for insertion between the lugs 43 of the collar and a pin 56 projected through the holes 44 in the lugs 43 and a hole 57 in the lug 55 pivotally connects the tube or barrel with the handle 20 through the medium of the spring connector. From the inner end of the spring connector projects a threaded shank 58 on which one end of the spring 59 may be screwed by means of its coils.

The opposite end of the spring has threaded connection with a similarly threaded shank 60 formed as a part of the spring anchor 61 fixed in the inner end of the inside tube 62 which is slidably mounted in that portion of the bore of smaller diameter 47 in the barrel 45 so that the spring tends to draw the inside tube 62 into the barrel 45.

The inside tube 62 carries a pointer 63 projecting through the slot 48 in the barrel and coacting with a series of graduations 64 on either or both sides of the slot and said graduations may be numbered as shown in Fig. 8.

From the foregoing description it will be obvious that one end of the spring is connected to a stationary element and the other end to the telescoping inside tube 62 so that the latter is normally drawn into the barrel 45 after the manner of a plunger of the spring scale.

The shank 65, of what I term the tire hook 66, has a series of holes 67 formed therein for the insertion of a pin 68 which pin, when in place in one of these holes, is adapted to be seated in the notches 69 formed in the outer end of the inside tube 62 and held in place by the cap 70 threaded on the outer end of said inside tube as illustrated in Fig. 6. It might be well to state at this time that the longitudinal sliding movements of the inside tube are limited by the coaction of the pointer 63 with the ends of the slot 48 and therefore the outer end of the inside tube always projects beyond the contiguous end of the barrel 45.

The above described method of mounting the tire hook provides for the adjustment thereof, either to a right hand or left hand position by simply backing off the cap 70 a sufficient distance to permit the pin to be withdrawn from the notches 69 at which time the tire hook may be turned to a position directly opposite the former position and the pin then reseated in the notches and the cap screwed home to securely clamp the tire hook in its adjustment.

The tire hook may be extended, or retracted, relative to the inside tube 62 by placing the pin 68 in one or another of the holes 67, thus lengthening or shortening said hook relative to the pivot point 56 for a purpose to be presently related. The inside or concave surface of the hook is preferably slightly roughened as indicated at 71 to prevent the hook from slipping from the tire of a wheel while the device is in use.

From the foregoing description, the operation of my improved device is as follows:—The different parts of the brake tester having been adjusted for coaction with particular type and size of wheel, its hub and tire, the fulcrum member is engaged with the hub by causing the bearing members 32 to pass over or enter the hub, as the case may be, and the tire hook is engaged with the periphery of the tire as shown in Fig. 1. When thus assembled, the handle or lever 20 is pulled in opposition to the tire hook 66 which will cause the barrel 45 to pull away from the tube 62 against the action of the spring 59 and move the graduations 64 under the pointer 63 and when the power utilized in expanding the spring 59 becomes sufficient to start rotation of the wheel against the brake action thereof, the pointer will indicate the resistance offered by the brake to the turning of the wheel and when this amount of pull is noted, the application of the device to another wheel will enable the operator to adjust the brake on that particular wheel to correspond to the same resistance as to that of the first wheel tested and so on until any number of brakes of the same machine have been adjusted to properly correspond to one another.

It is a well known fact that brake bands are seldom if ever absolutely accurate or form true circles. Likewise, this is the case with brake drums so that in the majority of brakes there is a "high spot" where the brakes have a greater gripping action, and in the use of my device I have found it advisable to operate the tester until the wheel on which it is mounted turns a certain distance and then turn the handle or lever 20 back until the tire hook engages the tire at another point. By repeating these operations, which is practically ratcheting the tester about the wheel, the "high spot" can be located, since at this point the resistance indication of the spring will be greater than at all other points. Companion brakes should be tested in this manner so that the gripping actions of the several brakes at the high points will be the same.

To facilitate the holding of the brake lever in a given set position while the testing is being accomplished, any suitable holding medium may be utilized, but for convenience of illustration I have shown a brake pedal holder consisting of a tubular body 72 having one end flattened as at 73 after the manner of a blunt chisel blade, the opposite end having a circumferential groove 74 formed thereabout into which the end of the screw 75 is adapted to project and this screw is threaded through one wall of the cap 76, the latter being fitted over the end of the tube 72 so that when the end of the screw is projected into said groove the cap will be held against longitudinal movement but will be permitted to freely revolve around the tube after the manner of a swivel joint. Through the end of said cap 76 is threaded the rod 77 having a fork 78 at its outer end which is adapted to engage with the brake pedal 79 of the automobile. Thus it will be seen that by engaging this fork with the pedal and placing the flattened end 73 against the bottom of the automobile seat or some other abutment and then turning the cap 76 in the proper direction, the rod 77 will be screwed outward until the brake pedal has been brought to the proper position for the convenient testing of the brakes as before described.

By the use of my improved tester, the brakes of a motor vehicle may be so accurately adjusted that they will evenly grip all of the wheels of the machine, thereby causing said brakes to work under the most efficient conditions.

Of course I do not wish to be limited to the exact details of construction herein shown and described as these may be varied within the limits of the appended claims without departing from the spirit of my invention.

Having thus fully described my invention, what I claim as new and useful is:—

1. In a brake tester, a hand lever, a fulcrum member for engagement with the hub of a wheel carried by the lower end of said lever, a barrel having one end connected with the hand lever, said barrel having a longitudinal slot therein and graduations disposed along the edges of said slot, an inside tube telescopically mounted in the barrel, a pointer carried by said inside tube with the shank thereof in the slot, said pointer registering with the graduations, a coil spring having one end connected to the inner end of the inside tube and the other end anchored in the barrel, a tire hook provided with a shank having a series of holes passing therethrough in spaced relation longitudinally of the shank, a pin selectively mounted in one of said holes and adapted to register with notches formed in the outer end of said inside tube, and a cap threaded upon the end of the inside tube for holding the pin in the notches whereby the tire hook will be maintained in any adjusted position.

2. A brake tester comprising a hand lever, a barrel pivoted at one end to said lever, an inside tube adapted to slide back and forth within the barrel, a spring having one end connected with the inner end of said inside tube and the other end anchored in the barrel, a pointer carried by the inside tube and passing through a slot in the barrel for registering with graduations upon the outer surface of the barrel, a fulcrum member removably mounted on the lower end of the hand lever, bearing members removably mounted on the fulcrum member for engagement with the outside or inside of a wheel hub, and a tire hook adjustably and reversibly attached to the outer end of the inside tube.

3. The structure set forth in claim 2, wherein the fulcrum member includes three radial arms, and the bearing members project from both faces of the arms.

4. In a device of the character described, a hand lever, a fulcrum member carried by the lower end of said hand lever, bearing members carried by the fulcrum member for engagement with the outside or inside of a wheel hub of either a right or left hand wheel, a barrel pivotally and swingingly connected to the hand lever so as to have limited vertical and horizontal movements, an inside tube slidably mounted in said barrel, a spring connecting the hand lever with the inside tube, means for indicating the amount of force transmitted from the barrel to said tube, and a tire hook adjustably and reversibly mounted in said inside tube.

5. The structure set forth in claim 4, wherein the fulcrum member includes three radial arms, each having a series of holes therethrough in spaced relation longitudinally of the arm and a bearing member removably and adjustably mounted on each arm, each of said bearing members comprising a short section of rod having a threaded shank for projection through any one of the holes, and another section of rod having a threaded socket for threaded engagement with the said threaded shank.

6. In a brake tester, a tubular hand lever having a plurality of holes formed therein intermediate its ends and in spaced relation longitudinally of said hand lever, a hand hold on the outer end of said lever, a bifurcated plug mounted in the inner end of said hand lever, a fulcrum member including a plurality of radial arms, one of which is mounted in the bifurcated part of the plug, means to removably fasten said fulcrum member in the plug, bearing members carried by the arms of the fulcrum member with portions projecting from both faces of the fulcrum member to permit use of the device on right hand and left hand wheels with the bearing members projecting on the inside or outside of the wheel hub, a collar loosely mounted on the tubular hand lever and having a slot therein paralleling the opposite edges of said collar, a screw projecting through said slot and threaded into any one of the holes in the hand lever for holding the collar in any adjusted position longitudinally of the hand lever while permitting rotary movement of the collar on said hand lever, a barrel, a connecting member fixed in the inner end of said barrel and pivotally connected with the collar and said connecting member further having a threaded shank located within the barrel, an inside tube slidably mounted in the barrel with its outer end projecting beyond the outer end of the barrel, said outer end of the inside tube being externally threaded and having oppositely disposed notches formed therein, a spring anchorage fixed in the inner end of said inside tube, a threaded shank projecting therefrom, a coil spring screwed on to the threaded shanks of the connector and anchorage, a tire hook having a roughened concave surface for engagement with a tire and provided with a shank for insertion in the inside tube from the outer end thereof, said tire hook shank having a series of holes formed therethrough in spaced relation longitudinally of the shank, a pin for selective insertion in said holes with the ends of the pin in registration with the notches in the outer end of the inside tube, and a cap screwed upon the outer end of the inside tube for holding the pin in the notches whereby the tire hook will be held in its adjusted position.

WM. K. KINGSLAND.